Sept. 14, 1965   J. H. ANDRESEN, JR   3,205,708
COMBINED AIRSPEED AND MACH INDICATOR
Filed Dec. 6, 1961   3 Sheets-Sheet 3

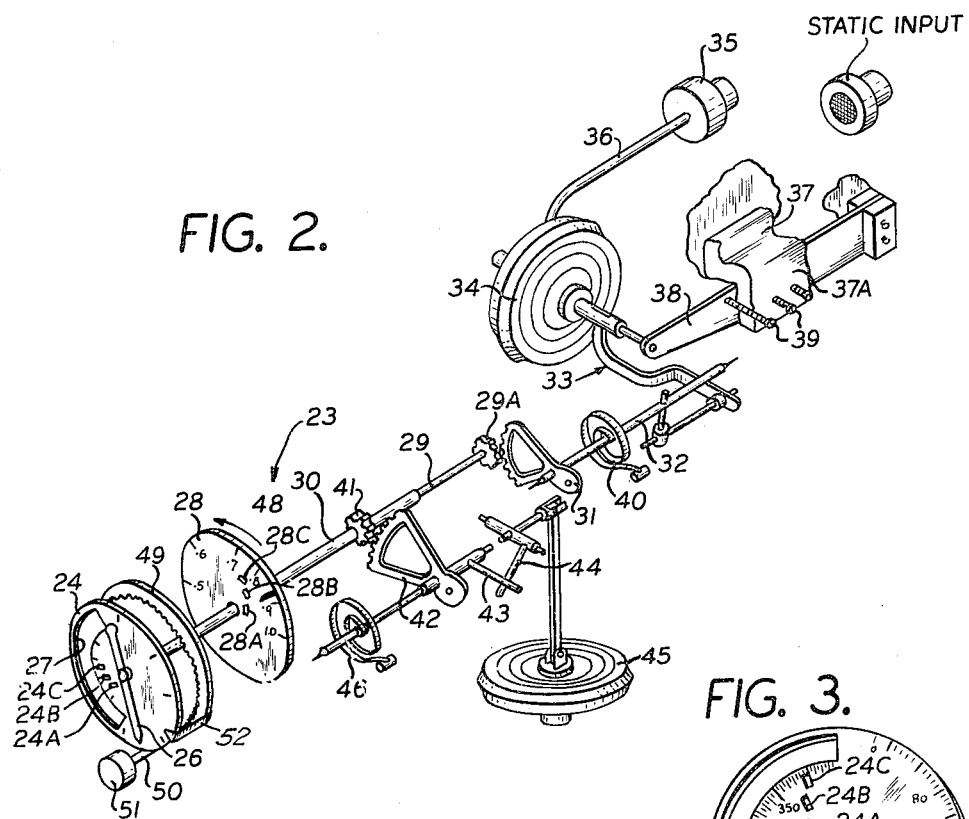

INVENTOR
JOHN H. ANDRESEN, JR.
BY
Hubbell, Cohen & Stiefel

ATTORNEYS.

United States Patent Office 3,205,708
Patented Sept. 14, 1965

3,205,708
COMBINED AIRSPEED AND MACH INDICATOR
John H. Andresen, Jr., Greenwood Lake, N.Y., assignor to Astek Instrument Corp., Armonk, N.Y., a corporation of New York
Filed Dec. 6, 1961, Ser. No. 157,513
15 Claims. (Cl. 73—182)

This invention relates in general to an airspeed indicator, and more specifically to an airspeed indicator for use in high speed subsonic or supersonic aircraft.

In high speed subsonic or supersonic aircraft it is essential for the safety of both the pilot and the aircraft that the safe maximum airspeed assigned to a particular class of such aircraft not be exceeded. Heretofore, it has been customary to apprise a pilot of the maximum safe speed of a given craft simply by placing a warning mark on the face dial of an airspeed indicator alongside the airspeed designation which is determined to be the maximum allowable safe airspeed. Such warning marks generally consisted simply of a red line fixed at the predetermined airspeed designation. Thus the safe maximum allowable airspeed for a given aircraft was that speed at which it was "red lined." The aircraft would then be controlled so that the airspeed pointer would not exceed the "red lined" airspeed designation. With this method of "red lining," the allowable maximum speed of a given aircraft was fixed and therefore a constant for all flight altitudes for which airspeed was a limiting parameter.

However not all aircraft have a constant or fixed maximum airspeed characteristic. Many have a safe maximum allowable airspeed characteristic that will vary with altitude, i.e., the maximum allowable speed increases as altitude increases. For such aircraft, use of the fixed or constant "red lined" type of airspeed indicator will not be efficient. This is because the use of the known fixed "red lined" airspeed indicator in an aircraft having a maximum airspeed characteristic that varies with altitude will read properly only at one altitude. Therefore for safety reasons, and one required by safety regulations, a fixed "red lined" type of airspeed indicator when employed in an aircraft having a maximum speed characteristic that varies, i.e. increases, with altitude, will of necessity have to be "red lined" at its lowest maximum permitted speed for sea level flight. If such maximum airspeed indicator was "red lined" at some other maximum speed other than that maximum for sea level flight to take advantage of higher maximum speeds for higher altitude flying, then such "red lined" airspeed indicator would indicate permission for the pilot to fly at higher speeds than would be safe for the aircraft at lower altitudes. Obviously, safety factors and safety regulations for enforcing the same prohibit any such "red lining" of a fixed or constant "red line" type of airspeed indicator. Thus, use of the known fixed maximum airspeed indicator would indicate at the higher altitudes a permissible speed much lower than that which would be safe for the given aircraft, thus greatly slowing the trip.

In high speed aircraft maximum speed of the aircraft is governed at the higher altitudes by a Mach number and by airspeed at the lower altitudes. For this reason it has been common to combine a Mach indicator with an airspeed indicator. However, in such combined indicators, the maximum speed permitted in the lower altitude ranges was fixed at a constant value in the manner above described. Therefore flights in the lower altitude ranges were subjected to the same inherent disadvantages above set forth when such combined Mach and airspeed indicators were employed in aircrafts having a maximum allowable airspeed characteristic that varies with changes in altitude.

Therefore, an object of this invention is to provide an improved airspeed indicator constructed and arranged for indicating on the face thereof an indication of an allowable safe maximum airspeed for use in an aircraft having a maximum safe airspeed characteristic that varies with altitudes.

Another object of this invention is to provide a novel combination airspeed and Mach indicator for use in high speed subsonic or supersonic aircrafts for indicating maximum safe speed based on airspeed and Mach number where each is a limiting parameter.

Still another object is to provide a combination airspeed and Mach indicator for indicating the maximum allowable airspeed for an aircraft having a maximum airspeed characteristic that increases as altitude increases below that point at which a Mach limitation is reached.

Still a further object is to provide a novel airspeed indicator in which the marking for apprising a pilot as to the maximum safe airspeed of a given aircraft will appear as a moving line on the face of the airspeed indicator.

A feature of this invention resides in the provision of a novel airspeed indicator which will enable a pilot to assume a flight plan in which the maximum allowable speed of his aircraft can be maintained in a manner which will enable him to closely approach the theoretical maximum safe speed of an aircraft having a maximum airspeed characteristic that varies with altitude up to that point at which a Mach number becomes the limiting parameter.

The above objects, features and other advantages are attained by an indicator having a co-operating fixed dial and a co-axially disposed sub-dial rendered movable relative thereto. Two mechanically separate diaphragm capsule driven mechanisms are included. One is a precision, single turn airspeed mechanism responsive to airspeed for driving the instrument's single pointer through approximately 340 degrees of rotation for designating the airspeed range indexed on the fixed dial. The second mechanism is actuated by an evacuated capsule responsive to ambient air pressure and it controls the rotation of the sub-dial relative to the fixed dial.

In accordance with this invention, the face of the fixed dial of a given background color has formed therein a series of circumferentially and radially spaced windows or cut-outs, each of which is pointed to a progressively increasing airspeed designation. Behind the fixed dial is a sub-dial having the same given background color. Provided on the sub-dial and adapted to register with the cut-outs or windows are a series of arcuate bands or marks of contrasting color spaced at radii corresponding to the radii of the cut-outs or windows of the fixed dial. The color bands of the sub-dial are thus located relative to respective cut-outs or windows of the fixed dial so that at the proper altitudes the appropriate mark or arcuate band will appear and be visible through one of the windows. Therefore, as altitude varies, the visible portion of the respective radially spaced color bands will vary accordingly, and thus make the limiting indication, below a Mach limitation, appear as a moving red line on the face of the airspeed dial.

To render the airspeed indicator a combined airspeed indicator and Mach indicator, the sub-dial may be provided with a Mach number scale. In such combined airspeed and Mach indicator a co-operating portion of the airspeed dial is cut away so as to render the Mach scale of the sub-dial visible therethrough when an altitude and speed is reached at which the Mach number becomes the limiting parameter. Further, a manually operated index arranged to travel about the periphery of the main dial is provided to draw attention to the salient airspeed values in the low airspeed range.

The various features of novelty which characterize the invention are pointed out with particularity in the claims annexed to and forming a part of this specification, but for a better understanding of the invention, its operating advantages and specific objects attained by its use, reference should be had to the accompanying drawings and descriptive matter in which there is illustrated and described a preferred embodiment of the invention.

In the drawings:

FIG. 2 is an exploded perspective view of a combined airspeed and Mach indicator embodying this invention;

FIG. 3 is a detail front view of the airspeed dial;

FIG. 4 is a detail front view of the sub-dial;

FIG. 5 is a detail view of a modified sub-dial with airspeed dial shown in phantom to show the relationship of the dials;

Figure 1:
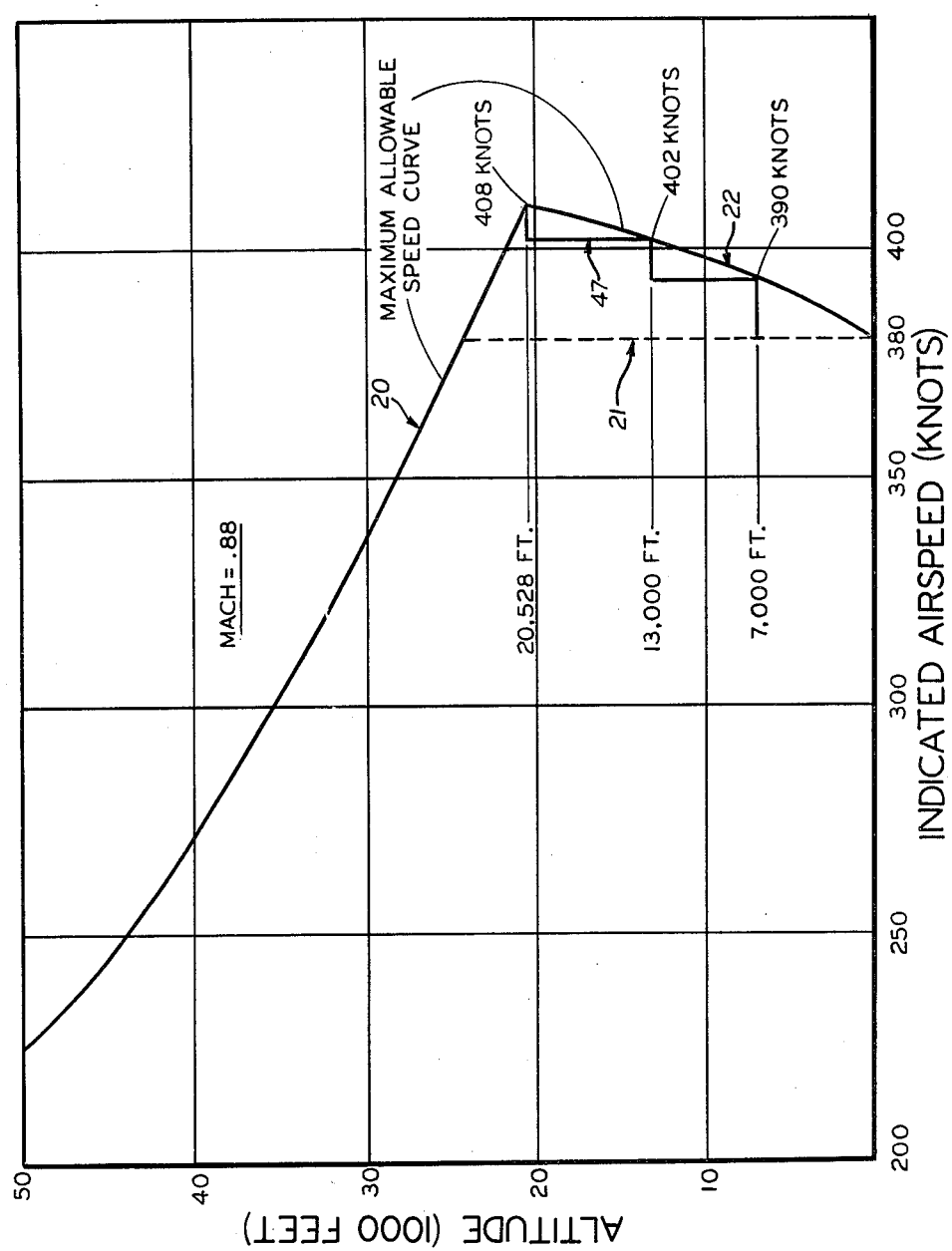
FIG. 1 is a graphic representation of a typical limiting speed curve of an aircraft having a maximum speed characteristic that varies with altitude compared to a speed curve of an aircraft having a constant maximum speed characteristic.

With reference to the speed curve 20 of FIG. 1 it will be noted that in subsonic or supersonic aircrafts, the maximum speed of an aircraft is at times dependent on airspeed and at other times dependent upon the Mach number at which the aircraft is flying. Since the speed of sound is not constant, but a variable, the Mach number for a given indicated airspeed will increase with increasing altitude.

As seen in FIG. 1, the maximum speed for some aircrafts is a given constant indicated airspeed, as noted by the dotted line 21 to an altitude at which the indicated airspeed exceeds a certain Mach number, and thereafter the certain Mach number determines the maximum allowable speed. In aircraft with such flight characteristics it is known to combine a Mach and airspeed indicator in which the indicated Mach number is superimposed on the indicated airspeed dial. In such combined instruments there was marked on the face of the airspeed dial a warning indication or mark at the maximum permissible airspeed for low altitude flying. Painted on the relatively movable Mach dial was a second warning mark at the maximum permitted Mach speed. Thus with such instruments the maximum airspeed was fixed for all levels of flight in the lower altitude range.

However, in many types of aircraft the maximum allowable airspeed for the various levels of flight at the lower altitude is not a constant value, but one that increases with altitude as shown by the solid line portion 22. In such aircraft the "fixed red line" airspeed indicator is not suitable. Therefore, in accordance with this invention, the description of an improved airspeed indicator, particularly suitable for such aircraft is set forth. The invention is also particularly suitable for embodiment in a combined Mach and airspeed indicator as will be herein described.

Referring to the drawings, the improved combined Mach and airspeed indicator 23 of this invention includes a fixed airspeed dial 24 enclosed within a suitable casing or housing 25. The face of the dial has marked thereon a suitable airspeed scale. In the illustrated embodiment the airspeed is scaled to read from 0 to 450 knots, the range of which is constructed to cover approximately 340° of rotation of the instruments single pointer 26. Naturally, other speed ranges may be employed without departing from the invention. Preferably the airspeed designations or markings of dial 24 are matte white on a dull black background; and nonessential markings made black to prevent unnecessary dial clutter.

As shown, the fixed dial 24 is provided with an arcuate cut out portion 27 to provide a window for viewing the Mach number scale of the Mach sub-dial 28 co-axially disposed with respect to the fixed dial 24. The arcuate cut out 27 preferably is disposed along the outer peripheral portion of the fixed dial 24 adjacent the high airspeed marking. For example, it extends between the 200 and 450 knot designations. In this illustrated embodiment the scale of the airspeed dial 24 is expanded in the 60 to 200 knot range to provide a readability of 1 knot. The Mach number scale on the sub-dial 28, which is of prime interest at the higher speeds, is graduated every .01 Mach and rendered easily readable to .005 Mach. The Mach scale designations are also preferably in matte white on dull black background.

Associated with each of the dials 24, 28 is the single pointer 26, which has its axis of rotation concentrically disposed with respect to the fixed dial 24 and its associated cut-out portion 27. The pointer 26 is fixed to a pointer shaft 29 which passes through the fixed dial 24, and sleeve 30 to which the sub-dial 28 is fixed. The end of the pointer shaft 29 has fixed thereat a pinion 29A meshing with a gear sector 31 fixed to a shaft 32. Shaft 32 in turn is connected through a suitable linkage means 33 to a pressure activated capsule 34, the interior of which is connected to a pitot pressure source 35 by a line 36 while the exterior of the capsule 34 is subjected to ambient pressure.

Means for calibrating the pressure responsive airspeed capsule 34 is also provided. This comprises a calibrating screw block 37 fixed to the frame of the instrument. The block 37 has an offset portion 37A disposed adjacent a calibrating spring 38 which is rendered adjustable by screws 39 for controlling the degree of expansion and contraction of the airspeed capsule 34, and in turn the rotation of the airspeed pointer 26 accordingly. The mechanism described is calibrated to produce a relatively large rotational movement of the pointer 26 at the low airspeeds to permit readability in one knot increments in the take-off and landing range. In the higher speed ranges the mechanism described is calibrated so that rotation of the pointer 26 varies with the logarithm of the pressure. Completing the airspeed drive mechanism is the usual restoring spring 40.

The sub-dial 28 containing the Mach designations is fixed to the hollow shaft or sleeve 30 mounted so as to be rendered rotatable relative to the pointer shaft 29 extending therethrough. A pinion gear 41 is fixed to the shaft 30. The pinion gear 41 in turn is connected in meshing relationship to a gear sector 42, and it is fixed to a maximum allowable calibrating adjustable linkage 43 connected with a pressure operated drive mechanism 44 which is actuated by the expansion or contraction of an evacuated capsule 45 due to changes of ambient air pressures. Thus the drive mechanism 44 of the sub-dial 28 is similar to an altimeter. Its linkage 43 is such that it will rotate the sub-dial 28 at an angular rate which varies linearly with the logarithm of the static pressure. This mechanism likewise includes the usual restoring spring 46.

The airspeed dial and sub-dial scale designations are so selected that the single pointer 26 shows airspeed in the inner scale of the fixed dial 24, and at the same time shows the Mach number on the scale of the sub-dial 28 rendered visible through the cut-out portion 27 of the fixed dial 24.

For aircraft in which the maximum indicated airspeed varies with altitude below the point where a Mach limitation is reached; means are provided for indicating the variable maximum allowable airspeed by an indicating mark which will appear as a moving, short, readily noticeable line on the face of the airspeed dial 24. The arrangement is such that the limiting indicating line will point to a different maximum allowable airspeed as the altitude of the aircraft is changed; and thereby enables the pilot to approach the theoretical maximum airspeed of the given aircraft as indicated by curve portion 22 of curve 20 in FIG. 1.

This is attained by providing the fixed dial 24 with a plurality of circumferentially and radially spaced elongated cut-outs or windows 24A, 24B, 24C, each of which points to a progressively increased, predetermined airspeed indication. Each cut-out or window 24A, 24B, 24C is thus spaced at a different radius from the center of the respective dial 24. Behind the respective cut-outs or windows 24A, 24B, 24C there is printed, preferably in a color of contrasting red, on the black background of sub-dial 28, a series of arcs 28A, 28B, 28C spaced on radii corresponding respectively to the radii of the windows 24A, 24B, 24C. Thus arcs are so located that at the proper altitude the appropriate portion of the arcs 28A, 28B, 28C will appear visible on the face of the fixed dial 24 through the appropriate cut-out or window 24A, 24B, or 24C.

As shown in FIG. 4, the color bands 28A, 28B, 28C on the sub-dial 28 are arranged so that the ends of the respective radially spaced bands are contiguous and do not overlap. With this arrangement it will be apparent that in the transition stage for indicating a change in the permissible maximum airspeed in the lower altitude ranges, the red line will fade out of one window as it fades into the next succeeding window. That is a radius defining the leftmost end of one band, e.g. band 28B, will define the rightmost end of an adjacent band, e.g. 28A, whereby to have the bands in radial spaced end to end relationship.

A modified sub-dial is shown in FIG. 5. In this form the end portions of adjacent color bands 28A', 28B' and 28C' overlap slightly. Therefore, during the transition in flying from one range of altitude to another, it will be possible for two limiting indications to appear on the face of the fixed dial at the lower altitudes due to the overlapping ends of the adjacent color bands. In such circumstances the pilot is to be guided by the lower of the two visible indications.

Thus it will be apparent that as the evacuated capsule 45 expands and contracts to effect rotation of the sub-dial 28 relative to the fix dial 24 through linkages 43, 44, the limiting indication of maximum allowable airspeed visible on the face of the fixed dial will vary accordingly.

For the foregoing description it will be apparent that the accuracy of the described limiting mark is dependent on the number of cut-outs or windows provided. However, practical experience has indicated that three cut-outs or windows 24A, 24B, 24C are sufficient. Hence the indicating accuracy will be ⅓ of the spread in maximum indicated airspeed below the altitude at which the Mach number becomes the limiting factor. Generally this spread is small for the modern jet aircraft. FIG. 1 illustrates the stepped curve 47 possible by the described arrangement. However, it will be understood that the number of windows may be increased or decreased according to varying conditions or desired visibility.

In the described indicator the airspeed pointer 26 will indicate airspeed in collaboration with the airspeed dial 24 at the lower altitude and the Mach number in collaboration with the Mach sub-dial 28 at the higher altitudes. The Mach number sub-dial 28 will have marked thereon at some predetermined point an arrow or other indicia 48 to indicate maximum permissible Mach number of the given aircraft. The arrangement of the respective airspeed variable indicating marks 28A, 28B, 28C, as described, and the Mach limiting mark 48 is such that aircraft should be operated so that the airspeed pointer 26 will not go beyond the lower of the two marks, i.e. the airspeed limiting mark and the Mach limiting mark.

In the illustrated embodiment the cut-out or window 24A nearest the center of the dial 24 points to a relatively low indicated airspeed, e.g. 380 knots. The next radially outwardly spaced cut-out 24B points to a higher indicated airspeed, e.g. 390 knots. The outermost cut-out or window 24C points to a still higher indicated airspeed, e.g. 402 knots. The respective colored bands 28A, 28B, 28C are disposed in alignment behind the fixed dial 24.

If desired, a manual settable marker or memory index 52 arranged to travel about the outer periphery of the fixed dial 24 may be provided. This index comprises a ring gear 49 disposed between the fixed dial 24 and sub-dial 28. The gear ring 49 and connected marker 52 is rotated by meshing with a pinion (not shown) connected to the end of a shaft 50 connecting with the turn knob 51 located at the front of the indicator. Thus the index 52 can be manually set to display any other critical speed point which the pilot wishes to set into the indicator such as climebout, approach, takeoff and the like.

Figure 6:
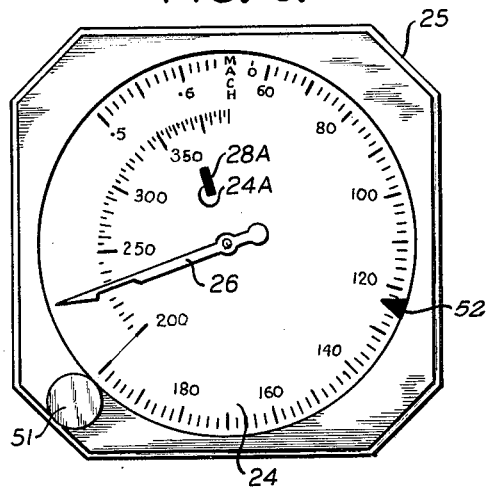
FIGS. 6 to 8 are a front detail view of the combined airspeed and Mach indicator illustrated as each will appear to the eye of a pilot at the various altitudes indicated on the speed curve of FIG. 1.

The operation of the described airspeed indicator is as follows:

When a given aircraft is flying at a low altitude, e.g. from 0 to 7000 feet, the face of the indicator will appear as shown in FIG. 6. That is, the sub-dial 28 is rotatably oriented so that the arcuate band 28A comes into register with the window 24A and thereby becomes visible on the face of the airspeed dial 24 as a red marker pointing to 380 knots. (See FIG. 1.) Thus the pilot is warned not to exceed 380 knots in this altitude range. In this altitude range windows 24B and 24C will for all practical purposes be rendered invisible due to the matching color background of the respective dials 24 and 28.

Figure 7:
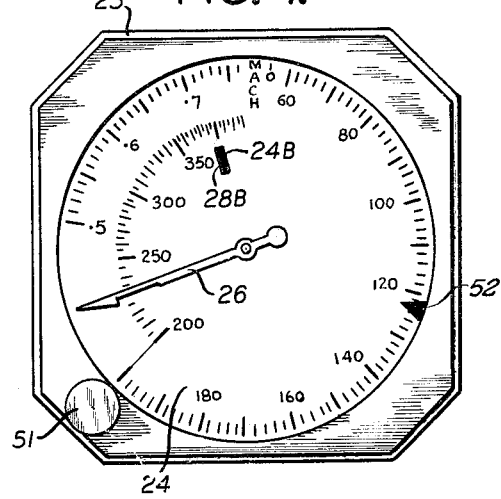

As the aircraft moves through and above the 7000 foot level and up, to say the 13,000 foot level the sub-dial 28 will have rotated sufficiently to move the arcuate strips 28A out of registry with window 24A and moves the next arcuate strip 28B into registry with the next succeeding window 24B. Thus the visible portion of the band 28B through window 24B will point to an increased maximum airspeed of 390 knots when flying through the 7000 to 13,000 foot altitude range. In this range, the general matching black colors of the sub-dial 28 will underlie windows 24A and 24C, so that for all practical purposes windows 24A and 24C disappear from view, as seen in FIG. 7. Thus the pilot sees only the red mark 28B in window 24B and the pilot is thereby warned not to exceed 390 knots in this range of altitude.

Figure 8:
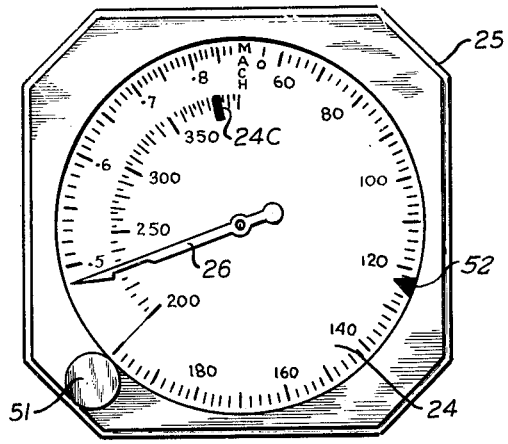

As the aircraft continues to rise between the 13,000 to 20,528 foot altitude, the strip 28B will move out of registry with windows 24B, and strip 28C moves into registry with window 24C to signify that 402 knots is now the maximum allowable airspeed in this latter altitude range. At that point windows 24A and 24B will not be rendered visible, as seen in FIG. 8; due to the fact that they each overlie a surface which is substantially of the same matching color as the surface of the fixed dial 24 in which windows 24A, 24B are cut.

Figure 9:
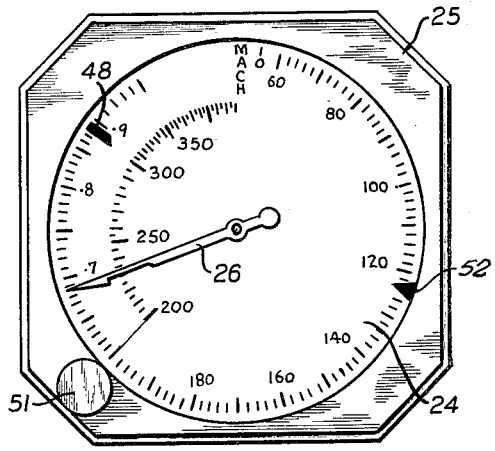
FIG. 9 is a view of the airspeed Mach indicator as it appears to a pilot at an altitude at which its Mach number is a limiting parameter.

However, at the next higher range of altitude, say above 20,528 feet, the maximum allowable speed will be governed not by airspeed alone, but by Mach number. For example, it may be assumed that a given class of aircraft is not permitted to exceed Mach .88. Therefore at above 20,528 feet, the warning indicator 48 pointing to Mach .88 will move into controlling position, and as a consequence band 28C will move out of registry with window 24C. At this higher altitude range each of the red bands 28A, 28B, 28C are moved beyond their respective windows 24A, 24B, 24C and each window rendered invisible for all practical purposes. (See FIG. 9.)

Thus, at the higher altitudes, the maximum speed permitted is .88 Mach in the illustrated example, and this maximum will govern for flight through the elevated altitudes.

From the foregoing it will be apparent that the described airspeed indicator is relatively simple in construction and positive in operation. With the innovation described, a means is provided for guiding a pilot which renders it possible for him to closely approximate the theoretical maximum speed curve when piloting an aircraft having a maximum speed characteristic that varies with altitude.

While in accordance with the provision of the statues there is illustrated and described herein a specific form of the invention, and those skilled in the art will understand that changes may be made in the form of the apparatus disclosed without departing from the spirit of the invention covered by the claims, and that certain features of the invention may sometimes be used to advantage without a corresponding use of the other features.

What is claimed is:

1. An airspeed indicator comprising an airspeed dial having airspeed designation on the face thereof, a series of windows formed in the face of said airspeed dial, each of said windows pointing to a predetermined airspeed designation on the face of said dial, a sub-dial concentrically disposed with respect to said airspeed dial, said sub-dial being movable relative to said airspeed dial, and having thereon a series of arcuate band markings which are adapted to move into and out of registry with one of the windows of said airspeed dial, an airspeed pointer cooperating with said airspeed dial, pressure operated means responsive to airspeed for rotating said pointer relative said airspeed dial, and pressure responsive means for moving said sub-dial relative said airspeed dial to permit registry of the marking of said sub-dial with a corresponding window in said airspeed dial to indicate on the face of said airspeed dial a variable maximum allowable airspeed limit not to be exceeded by said pointer.

2. The invention as defined in claim 1 wherein said airspeed dial has a cut-out portion, and said sub-dial has a scale of Mach designations adapted to register with the cut-out portions of said speed dial.

3. An airspeed indicator for use in aircraft comprising an airspeed dial having a scale of airspeed designations on the face thereof, a sub-dial rendered angularly movable relative to said airspeed dial, said sub-dial having a series of radially spaced arcuate shaped colored bands marked thereon, a series of radially and circumferentially spaced windows formed in the face of said airspeed dial to permit selective viewing of the color bands of said sub-dial, each of said windows in line with a different airspeed designation on the face of said speed dial, an airspeed pointer cooperating with said airspeed dial; pressure responsive means for actuating said pointer, and pressure operated means responsive to changes in altitude for moving said sub-dial relative said airspeed dial to control the registry of the color markings of said sub-dial with their corresponding windows in said airspeed dial so as to indicate on the face of said airspeed dial a variable maximum allowable airspeed limit not to be exceeded by the aircraft.

4. An airspeed indicator adapted for use in aircraft comprising an airspeed dial having a scale of airspeed designations indicated on the face thereof, said dial having a plurality of circumferentially and radially spaced, radially extending elongated cut-outs to define a series of windows in the face of said airspeed dial, each of said windows in line with a predetermined progressively increasing airspeed designation marked on said airspeed dial, a sub-dial movable angularly relative to said airspeed dial, said sub-dial having a series of colored markings thereon that contrast with the base color of said airspeed dial and move into and out of register with one of the windows of said airspeed dial, an airspeed pointer cooperating with said airspeed dial, pressure operated means responsive to airspeed for rotating said pointer relative said airspeed dial, and pressure responsive means for rotating said sub-dial relative to said airspeed dial whereby the colored marking of said sub-dial are moved in and out of registry with respect to one of the corresponding windows in the face of said airspeed dial for indicating on the face of said airspeed dial a readily visible and variable maximum airspeed limit not to be exceeded by said pointer.

5. An airspeed indicator adapted for use in aircraft comprising an airspeed dial having a scale of airspeed designations on the face thereof, said dial having an arcuate cut-out portion and a series of angularly spaced windows at different radii from the center of said dial, each of said windows in line with a predetermined progressively increasing airspeed designations marked on the face of said dial, a sub-dial rendered movable relative to said airspeed dial, said sub-dial having a scale of Mach designations thereon adapted to register with said cut-out and a series of colored bands contrasting in color to that of the face of said speed dial, and each of which is adapted to move into and out of registry with one of the windows of said airspeed dial, an airspeed pointer cooperating with said airspeed dial, pressure operated means responsive to airspeed for rotating said pointer relative said dial, and pressure means responsive to ambient air pressure for rotating said sub-dial relative to the airspeed dial whereby the color bands of said sub-dial are moved in and out of registry with respect to the corresponding windows of said airspeed dial so as to appear as a moving line for indicating on the face of said airspeed dial a readily visible and variable maximum airspeed limit where airspeed varies with altitude below a point where Mach limitation is reached.

6. An airspeed indicator for use in aircraft comprising a fixed airspeed dial having airspeed designations on the face thereof, said dial having an arcuate cut-out portion, a movable sub-dial having Mach designations thereon, said sub-dial being concentrically disposed with respect to said fixed dial, said Mach designation on said sub-dial being disposed in alignment with the arcuate cut-out portion of said airspeed dial so as to be rendered visible therethrough, pressure operated means responsive to ambient pressure for rotating said sub-dial relative to said fixed dial for bringing said Mach designation into view on the face of said fixed dial, a pointer cooperating with each of said dials, pressure operated means responsive to airspeed for moving said pointer relative to said dials, said fixed dial having a series of circumferentially spaced radially disposed windows therein, each of said windows pointing to a predetermined airspeed designation, and said sub-dial having a series of arcuate bands radially spaced thereon, each of said bands being visible through its respective window throughout a predetermined speed range for indicating on the face of said fixed dial a safe maximum allowable speed limit that varies with altitude.

7. An airspeed indicator comprising an airspeed dial having a scale of airspeed designations on the face thereof, a series of windows formed in the face of said airspeed dial, each of said windows being angularly disposed and spaced radially outward one from another from the center of the dial, and each of said windows pointing to a predetermined airspeed designation on the face of said airspeed dial, a sub-dial concentrically disposed with respect to said airspeed dial and angularly movable relative to said airspeed dial, said sub-dial having a series of arcuate shaped color bands thereon, each of said arcuate bands being radially spaced so as to be disposed in alignment with one of said windows whereby said bands are adapted to move into and out of registry with the window aligned therewith, an airspeed pointer cooperating with said airspeed dial; pressure operated means responsive to airspeed for rotating said pointer relative said airspeed dial; and pressure operated means responsive to ambient pressure for moving said sub-dial relative said airspeed dial whereby the relative rotation of said dials permit registry of the markings of said sub-dial with an aligned window of said airspeed dial for indicating on the face of said airspeed dial a maximum allowable airspeed limit that is rendered variable with changes of altitude.

8. The invention as defined in claim 7 wherein said color bands of said dial are radially spaced with overlapping end portions.

9. The invention as defined in claim 7 wherein the ends of said color bands are radially spaced so as to terminate in end to end relationship.

10. An air indicator comprising an airspeed dial having a scale of airspeed designations on the face thereof, a series of radially elongated windows formed in the face of said airspeed dial, each of said windows being angularly disposed and spaced radially outwardly one from another at different radii from the center of the dial and each of said windows in line with a different airspeed designation on the face of said dial, said airspeed dial having a cut-out portion extending about an arcuate portion of its face, a sub-dial concentrically disposed with respect to said airspeed dial and angularly movable relative to said airspeed dial, said sub-dial having a scale of Mach number designations thereon, and a series of arcuate shaped color bands thereon, each of said arcuate bands being circumferentially and radially spaced whereby each of said bands are disposed in alignment with one of the windows of said airspeed dial whereby said bands are adapted to move into and out of registry with the window aligned therewith in accordance with the angular movement of said sub-dial relative said speed dial, and said scale of Mach number on said sub-dial being disposed so as to register with the arcuate cut-out portion of said airspeed dial, an airspeed pointer cooperating with said dial, pressure operated means responsive to airspeed for rotating said pointer relative said dials, and pressure operated means responsive to ambient pressure for moving said sub-dial relative said airspeed dial whereby the relative rotation of said dials permit registry of the color bands of said sub-dial with an aligned window of said airspeed dial to appear as a moving line for indicating on the face of said airspeed dial a variable maximum allowable airspeed limit not to be exceeded by said pointer where allowable airspeed varies with altitude below a point where a Mach limitation is reached.

11. The invention as defined in claim 10 and including means to provide a manually settable index for indicating allowable speeds for particular indications.

12. An air indicator comprising an airspeed dial having a scale of white airspeed designations on black colored face thereof, a series of radially elongated windows formed on the face of said airspeed dial, each of said windows being angularly disposed and spaced radially outwardly a different radii one from another from the center of the dial and each of said windows pointing to a different airspeed designation marked on the face of said dial, said airspeed dial having a cut-out portion extending about an arcuate portion of its face, a sub-dial concentrically disposed with respect to said airspeed dial and angularly movable relative to and behind said air-speed dial, said sub-dial having a scale of white Mach number designations on black background thereon, and a series of arcuate shaped bands marked on said sub-dial in a color contrasting with both black and white, each of said arcuate bands being circumferentially and radially spaced at radii whereby each of said bands are disposed in alignment with one of the windows of said airspeed dial whereby said bands are adapted to move into and out of registry with the window aligned therewith upon relative rotation of said dial, and said scale Mach numbers being disposed so as to register with the arcuate cut-out portion of said airspeed dial, an airspeed pointer cooperating with said dials, pressure operated means responsive to airspeed for rotating said pointer relative said dials, and pressure operated means responsive to ambient pressure for moving said sub-dial relative said airspeed dial whereby the relative rotation of said dials permit registry of the color bands of said sub-dial with an aligned window of said airspeed dial to appear as a moving line for indicating on the face of said airspeed dial a variable maximum allowable airspeed limit not to be exceeded by said pointer where airspeed varies with altitude below the point where a Mach limitation is reached.

13. An airspeed indicator comprising an airspeed dial having airspeed designation on the face thereof, a cut-out and a window formed in the face of said airspeed dial, said window pointing to a predetermined airspeed designation on the face of said dial, a sub-dial disposed in spaced surface confronting relation to said airspeed dial, and having indicia adapted to register with said cut-out, said sub-dial being movable relative to said airspeed dial and having thereon a marking which is adapted to move into and out of registry with said window of said airspeed dial, an airspeed pointer cooperating with said airspeed dial, pressure operated means responsive to airspeed for rotating said pointer relative said airspeed dial, and pressure responsive means for moving said sub-dial relative said airspeed dial to permit registry of the marking on said-dial with said window to indicate on the face of said airspeed dial the maximum allowable airspeed not to be exceeded by said pointer.

14. An airspeed indicator adapted for use in aircraft comprising an airspeed dial having a scale of airspeed designations on the face thereof, said dial having a cut-out portion and a window pointing to a predetermined airspeed designation, a sub-dial movable relative to said airspeed dial, said sub-dial having a scale of Mach designations thereon adapted to register with said cut-out and a maximum Mach number marking also adapted to register with said cut-out, said sub-dial further having marked thereon a marking of color contrasting with said airspeed dial face adapted to move out of and into register with said window as said maximum Mach number marking moves from above to below and from below to above, respectively, said predetermined airspeed designation, an airspeed pointer cooperating with said airspeed dial, pressure operated means responsive to airspeed for rotating said pointer relative said airspeed dial, and pressure means responsive to ambient air pressure for rotating said sub-dial relative to the airspeed dial whereby the contrasting color marking of said sub-dial is moved into and out of register with said window of said airspeed dial to yield an indication of maximum airspeed at altitudes where airspeed is the controlling speed parameter and to cause said indication to disappear at altitudes where Mach number is the controlling speed parameter.

15. An airspeed indicator adapted for use in aircraft comprising an airspeed dial having a face of preselected color and a scale of airspeed designations on the face thereof, said dial having a cut-out portion and a window pointing to a predetermined airspeed designation, a sub-dial movable relative to said airspeed dial, said sub-dial having a face of said preselected color and a scale of Mach designations thereon adapted to register with said cut-out, said sub-dial further having a maximum Mach number marking thereon and a marking of a color contrasting with said preselected color adapted to move out of and into register with said window as said maximum Mach number marking moves from above to below and from below to above, respectively, said predetermined airspeed designation, an airspeed pointer cooperating with said airspeed dial, pressure operated means responsive to airspeed for rotating said pointer relative said airspeed dial, and pressure means responsive to ambient air pressure for rotating said sub-dial relative to the airspeed dial whereby the contrasting color marking of said sub-dial is moved into and out of register with said window of said airspeed dial to yield an indication of maximum airspeed at altitudes where airspeed is the controlling speed parameter and to cause said indication to disappear at altitudes where Mach number is the controlling speed parameter.

References Cited by the Examiner

UNITED STATES PATENTS 2,197,759    4/40    Ewald _____ 116—124.3
2,706,407    4/55    Hosford _____ 73—182

LEO SMILOW, *Primary Examiner.*

ISAAC LISANN, *Examiner.*

UNITED STATES PATENT OFFICE
CERTIFICATE OF CORRECTION

Patent No. 3,205,708                          September 14, 1965

John H. Andresen, Jr.

It is hereby certified that error appears in the above numbered patent requiring correction and that the said Letters Patent should read as corrected below.

In the grant, line 3, and in the heading to the printed specification, lines 4 and 5, for "a corporation of New York " each occurrence, read -- a corporation of Delaware --.

Signed and sealed this 22nd day of August 1967

(SEAL)
Attest:

ERNEST W. SWIDER                         EDWARD J. BRENNER
Attesting Officer                           Commissioner of Patents